Sept. 5, 1939. M. GLOWKA 2,172,163
EXPLOSION PROPULSION MOTOR FOR AIRPLANES
Filed Nov. 10, 1937 2 Sheets-Sheet 1
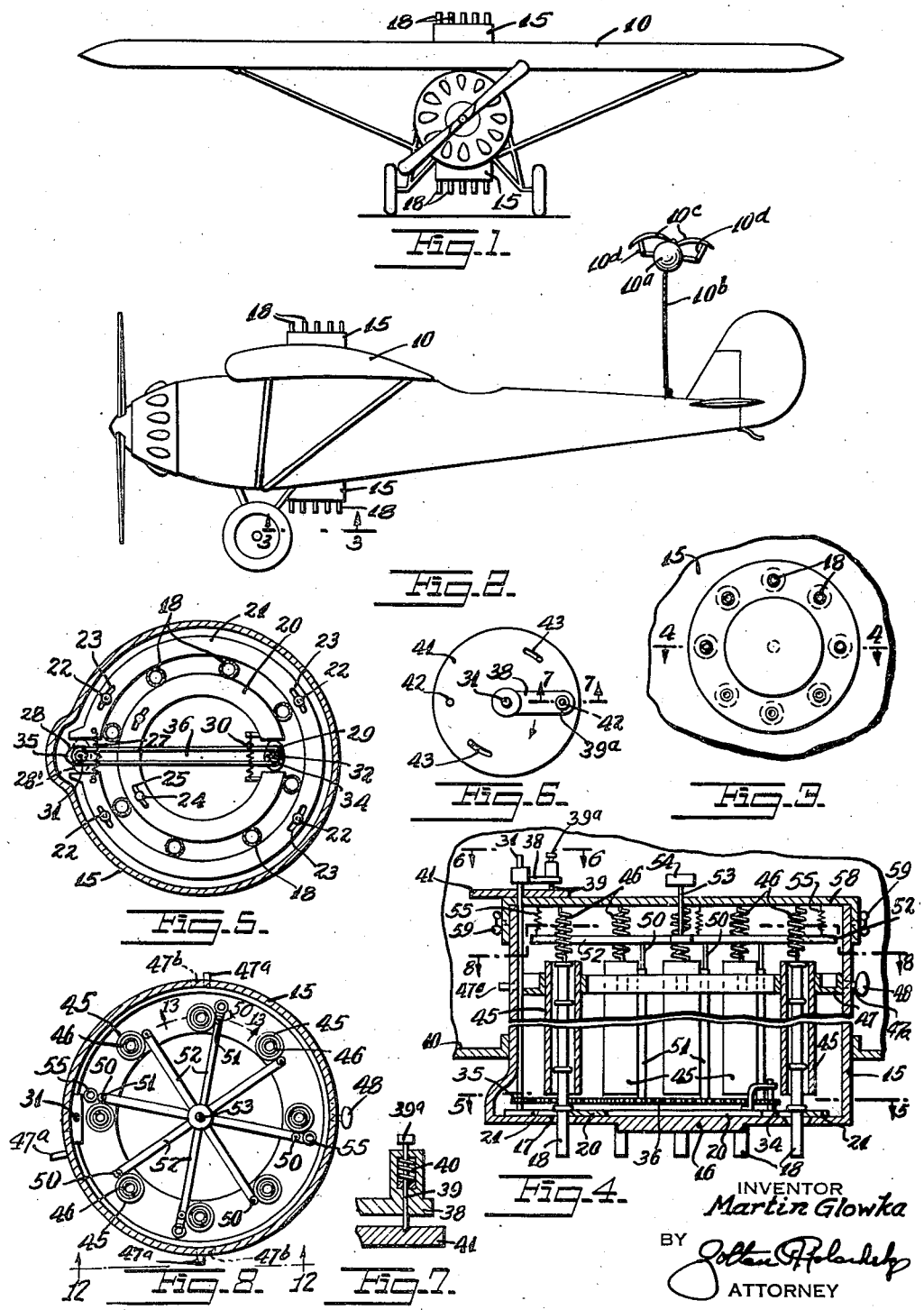
INVENTOR
Martin Glowka
BY
ATTORNEY Sept. 5, 1939.  M. GLOWKA  2,172,163
EXPLOSION PROPULSION MOTOR FOR AIRPLANES
Filed Nov. 10, 1937  2 Sheets-Sheet 2

INVENTOR
Martin Glowka
BY
ATTORNEY

Patented Sept. 5, 1939

2,172,163

UNITED STATES PATENT OFFICE 2,172,163

EXPLOSION PROPULSION MOTOR FOR AIRPLANES

Martin Glowka, New York, N. Y.

Application November 10, 1937, Serial No. 173,807

8 Claims. (Cl. 60—35.6)

This invention relates to new and useful improvements in an explosion propulsion motor for airplanes.

The invention has for an object the construction of a device as mentioned which is characterized by the fact that it is adapted to operate with gun powder or dynamite, cartridges or bullets, and the like.

Still further the invention proposes to so construct the explosion propulsion motor that it may be mounted on the top of an airplane, and/or upon the bottom thereof, and/or at other locations, if so desired.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of an airplane constructed according to this invention.

Fig. 2 is a side elevational view of Fig. 1.

Fig. 3 is an elevational view looking in the direction of the line 3—3 of Fig. 2.

Fig. 4 is a fragmentary enlarged sectional view taken on the line 4—4 of Fig. 3.

Fig. 5 is a horizontal sectional view taken on the line 5—5 of Fig. 4.

Fig. 6 is a fragmentary elevational view looking in the direction of the line 6—6 of Fig. 4.

Fig. 7 is a fragmentary enlarged sectional view taken on the line 7—7 of Fig. 6.

Fig. 8 is a horizontal sectional view taken on the line 8—8 of Fig. 4.

Figure 9:
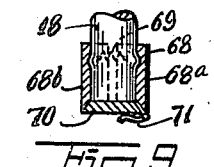
Fig. 9 is a fragmentary sectional view of a discharge tube used in the device.
Figure 10:
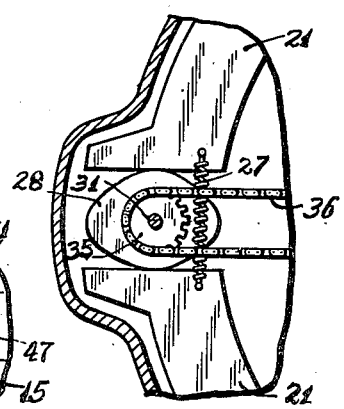
Fig. 10 is an enlarged detail view of a portion of Fig. 5.
Figure 11:
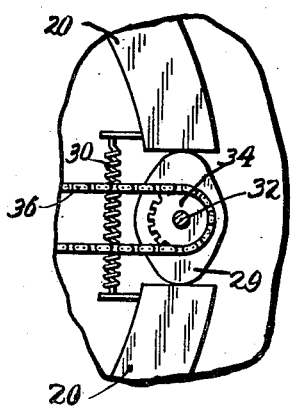
Fig. 11 is an enlarged detail view of another portion of Fig. 5.
Figure 12:
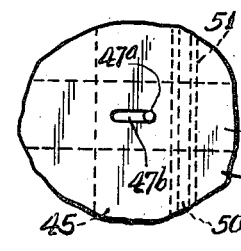
Fig. 12 is a view looking in the direction of the line 12—12 on Fig. 8.
Figure 13:
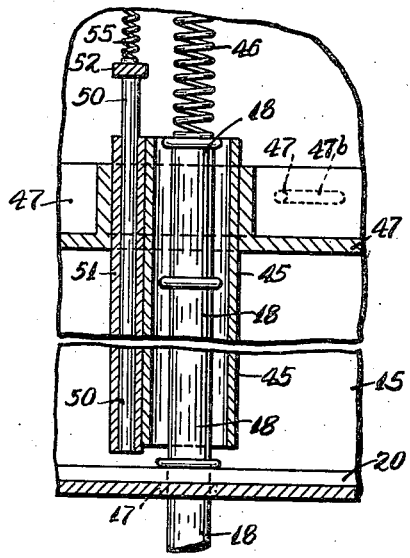
Fig. 13 is a sectional view on the line 13—13 of Fig. 8.
Figure 14:
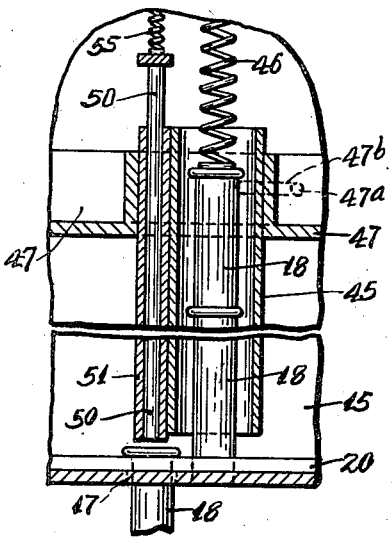
Fig. 14 is a view similar to Fig. 13 but showing a different position of the parts.

An explosion propulsion motor, according to this invention, is to be used in combination with an airplane 10. A motor is mounted on the top of the airplane shown on the drawings, and another identical motor is mounted on the bottom. Each of these motors comprises a hollow body 15 having an end wall 16 formed with openings 17 for the passage of bullets 18.

A means is mounted on the end wall 16 for releasably holding the bullets 18 which project through the openings 17. This means comprises a pair of concentric brake bands 20 and 21. The brake band 21 is secured by several bolts 22 passing through slots 23 to the end wall 16. The brake band 21 extends around the outer side of the bullets 18 which are in the openings 17 and which are arranged in a ring. The brake band 20 is coaxially arranged with relation to the ring of bullets 18 and the brake band 21 and acts against the inner sides of the bullets. The brake band 20 is supported by bolts 24 which are mounted in the end wall 16 and which engage through slots 25 formed in the band 20.

The ends of the brake band 21 are urged together by a strong spring 27. A cam 28 is located between the ends of the brake band 20 and in one position, it is adapted to permit the spring 27 to function, and in a turned position indicated by the dot and dash lines 28', the cam is adapted to open the brake band so that the bullets are free.

A cam 29 is rotatively supported between the ends of the brake band 20 and in the position shown in Fig. 5, spreads the brake band so that the brake band engages the bullets 18 to hold them in position. A spring 30 acts between the ends of the brake band so that when the cam 29 is turned the brake band 20 will contract to free the bullets.

The cams 28 and 29 are each mounted on a shaft 31 and 32 respectively, which shafts are supported in the end wall 16. Gears 34 and 35 are mounted on the shafts 31 and 32 and are connected with each other by a chain 36. The shaft 31 is extended through the body 15 to the upper side thereof. A handle 38 is mounted on the upper end of the shaft 31. This handle 38 is provided with a pin 39 which is resiliently urged downward by a spring 40 so that the pin 39 engages against the top of a disc 41. The disc 41 is mounted on the top of the body 15. This disc 41 is formed with a pair of diametrically opposite openings 42, and slightly to the front of each of these openings there are additional arcuate openings 43. The arrangement is such that when the handle 38 is turned, the pin 39 is adapted to engage in the openings 42 and 43 as the pin passes the same. Thus the shaft 31 will be arrested in certain positions.

The opening 42 at the right of Fig. 6 is arranged to hold the shaft 31 in a position in which the cams 28 and 29 are in positions as shown in Fig. 5. The handle 38 may be released by lifting up the pin 39 with one's fingers engaging the head portion 39ª of the pin. Then the handle 38 may be turned clockwise and the pin released so that the handle will be arrested and stopped when the pin 39 rides into the opening or groove 43, and is arrested by the end of the groove or opening 43. In this position the cams 28 and 29 will have been turned slightly less than 180°. This position should be one in which the cam 28 is slightly holding open the brake band 21 and the cam 29 slightly holding open the brake band 20. As the handle was turned, the bullets 18 which were held by the brake bands were dropped, and as the handle reached the new position, as determined by the opening 43, the brake bands are being held in a partially opened position sufficient to permit new bullets to fall in position, but insufficient to allow these bullets to fall completely out of the device.

Above each opening 17 there is a tube 45 for supplying bullets from the tube to the opening below. The tube 45 is adapted to hold a supply of bullets. A spring 46 is provided for each tube which acts against one of the ends of the supply of bullets to urge the bullets towards the opening 17. The tubes 45 are supported on a member 47 which is slightly rotative on the body 15, by reason of pegs 47ª on the member 47 engaging slots 47ᵇ in the body 15. This member 47 is controlled by a handle 48 formed on one of the pegs 47ª which projects out through one of the openings 47ᵇ. The handle 48 may be turned so as to move the tubes to one side of the openings 17 or directly over the openings, as desired or required.

A means is provided for striking the bullets held in the openings 17 to fire them. This means comprises a firing pin 50 for each tube 45 slidably engaged through a smaller tubular member 51 secured on the outer side of the tube 45. The pins 50 at their upper ends are connected with radial arms 52 which are joined at a common point at the center of the body 15. A rod 53 connects with the connected ends of the arms 52 and extends outwards through the end of the body 15. This rod 53 is provided with a head 54 by which it may be manually depressed. Several springs 55 are connected with certain of the arms 52 and with the end cover of the body 15 for holding the pins 50 indirectly in a raised position.

The body 15 is provided with an end cover 58 which is fixedly held in position by several clamp screws 59. This cover 58 may be removed to give access to the tubes 45 so that they may be refilled with bullets. The springs 46 are secured at one of their ends to the cover 58 and at their other ends extend downwards to the tubes.

A signal balloon 10ª is secured to the airplane by a cord 10ᵇ. This signal balloon has a pair of foldable wings 10ᶜ which may be held in an open position by elbow brackets 10ᵈ.

The operation of the explosion propulsion motor is as follows: Assume that the bullets 18 which are shown extending through the openings 17 in Fig. 4 are securely and fixedly held by the brake bands 20 and 21. Assume that the handle 48 is in position so that the firing pins 50 are directly over the bullets 18. To fire the motor it is merely necessary that the head 54 be given a smart blow so that all of the pins move down simultaneously and hit the caps or other firing elements in the rear ends of the bullets 18. The discharge will tend to propel the motor and an object to which the motor is mounted, such as the airplane, due to the recoil of the exploded bullets. The bullets may be blanks during peace time, or during war may be provided with lead heads.

To reload the openings 17 with fresh bullets it is merely necessary that the pin 39 first be raised so that its lower end disengages from one of the openings 42. Then the handle 38 is quickly turned until the pin 39 is arrested by an adjacent opening 43. During this interval of turning the following takes place: As the handle 38 is turned, the shaft 31 is turned so that the gears 34 and 35 turn and indirectly control the turning of both cams 28 and 29. The cam 29 will have turned from the position shown in Fig. 5, so that the brake band 20 opens completely and then partially closes. Similarly, the cam 28 will have turned so that the brake band 21 opens completely and then partially re-closes.

During the interval of time that both brake bands were fully open the spent bullets will drop from the openings 17. When the brake bands 20 and 21 are again closed the handle 48 is then turned to a position in which the tubes 45 are superimposed on the openings 17. Fresh bullets from the tubes 45 will be urged into the openings 17 by the expansion of the springs 46 and be arrested and held by the partially closed brake bands (the brake bands of course, engaging the enlarged rear ends of the bullets as shown in Fig. 4).

Each of the cams is symmetrical at the ends, so that now they are functioning as originally. They are functioning to cause the brake bands 20 and 21 to tightly grip and firmly hold the bullets connected with the body 15. The device is now in its original position and the bullets are ready to be fired.

In Fig. 9 a discharge tube 68 is illustrated made from adjacent sections 68ª and 68ᵇ urged together by springs 69. The lower end of the tube 68 is provided with a door closure 70 hingedly mounted and urged closed by a spring 71. A discharge bullet 18 is adapted to engage into the tube 68. When the bullet or blank cartridge discharges the door 70 will open to permit the discharge to enter the atmosphere.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an explosion propulsion motor for airplanes, a hollow body having an end wall with openings for the passage of bullets, means mounted on said end wall for releasably holding said bullets projecting through said openings, means for supplying bullets to said openings, and means for striking the bullets held in said openings for firing them, said means for releasably holding bullets projecting through said openings comprising concentric brake bands engaging the opposite sides of the bullets for fixedly holding them, said brake bands being mounted on said hollow body.

2. In an explosion propulsion motor for airplanes, a hollow body having an end wall with openings for the passage of bullets, means mounted on said end wall for releasably holding said bullets projecting through said openings, means for supplying bullets to said openings, and means for striking the bullets held in said openings for firing them, said means for releasably holding bullets projecting through said openings comprising concentric brake bands engaging the opposite sides of the bullets for fixedly holding them, said brake bands being mounted on said hollow body, each brake band being associated with a cam by which it may be released when desired.

3. In an explosion propulsion motor for airplanes, a hollow body having an end wall with openings for the passage of bullets, means mounted on said end wall for releasably holding said bullets projecting through said openings, means for supplying bullets to said openings, and means for striking the bullets held in said openings for firing them, said means for releasably holding bullets projecting through said openings comprising concentric brake bands engaging the opposite sides of the bullets for fixedly holding them, said brake bands being mounted on said hollow body, each brake band being associated with a cam by which it may be released when desired, said cams being connected and synchronized with each other.

4. In an explosion propulsion motor for airplanes, a hollow body having an end wall with openings for the passage of bullets, means mounted on said end walls for releasably holding said bullets projecting through said openings, means for supplying bullets to said openings, and means for striking the bullets held in said openings for firing them, said means for releasably holding bullets projecting through said openings comprising concentric brake bands engaging the opposite sides of the bullets for fixedly holding them, said brake bands being mounted on said hollow body, each brake band being associated with a cam by which it may be released when desired, said cams being connected and synchronized with each other, a shaft connected with one of said cams and provided with a handle, a pin resiliently mounted on said handle and cooperative with openings to arrest turning of the handle in certain positions.

5. In an explosion propulsion motor for airplanes, a hollow body having an end wall with openings for the passage of bullets, means mounted on said end wall for releasably holding said bullets projecting through said openings, means for supplying bullets to said openings, and means for striking the bullets held in said openings for firing them, said means for releasably holding bullets projecting through said openings comprising concentric brake bands engaging the opposite sides of the bullets for fixedly holding them, said brake bands being mounted on said hollow body, each brake band being associated with a cam by which it may be released when desired, said cams being connected and synchronized with each other, a shaft connected with one of said cams and provided with a handle, a pin resiliently mounted on said handle and cooperative with openings to arrest turning of the handle in certain positions, said openings being arranged at locations in which the brake bands are partially closed so that new bullets may be engaged into the openings.

6. In an explosion propulsion motor for airplanes, a hollow body having an end wall provided with a plurality of openings for the passage of bullets and arranged in a circle, a plurality of tubes superimposed above said openings for supplying bullets to said openings, a pair of concentric brake bands mounted on said end wall for contacting opposite sides of the bullets engaged within said openings for holding the same in position therein, means mounted in said tubes and alignable with said bullets in said openings for striking the same to fire them, a turnably mounted member supporting said tubes and movable to disalign said tubes from said openings and to align said means with said bullets in said openings to permit said means to be operated for firing said bullets, and means for opening said brake bands to release the fired bullets to permit them to drop out of said openings after which said brake bands are again closed and said tubes realigned with said openings to permit fresh bullets to be engaged into said openings.

7. In an explosion propulsion motor for airplanes, a hollow body having an end wall provided with a plurality of openings for the passage of bullets and arranged in a circle, a plurality of tubes superimposed above said openings for supplying bullets to said openings, a pair of concentric brake bands mounted on said end wall for contacting opposite sides of the bullets engaged within said openings for holding the same in position therein, means mounted in said tubes and alignable with said bullets in said openings for striking the same to fire them, a turnably mounted member supporting said tubes and movable to disalign said tubes from said openings and to align said means with said bullets in said openings to permit said means to be operated for firing said bullets, and means for opening said brake bands to release the fired bullets to permit them to drop out of said openings after which said brake bands are again closed and said tubes realigned with said openings to permit fresh bullets to be engaged into said openings, and a handle connected with said member to facilitate the turning thereof.

8. In a explosion propulsion motor for airplanes, a hollow body having an end wall provided with a plurality of openings for the passage of bullets and arranged in a circle, a plurality of tubes superimposed above said openings for supplying bullets to said openings, a pair of concentric brake bands mounted on said end wall for contacting opposite sides of the bullets engaged within said openings for holding the same in position therein, means mounted in said tubes and alignable with said bullets in said openings for striking the same to fire them, a turnably mounted member supporting said tubes and movable to disalign said tubes from said openings and to align said means with said bullets in said openings to permit said means to be operated for firing said bullets, and means for opening said brake bands to release the fired bullets to permit them to drop out of said openings after which said brake bands are again closed and said tubes realigned with said openings to permit fresh bullets to be engaged into said openings, said means for striking said bullets, comprising firing pins slidably mounted on said tubes, and means for depressing said firing pins when they are aligned with the bullets in said openings.

MARTIN GLOWKA.